Nov. 19, 1946.   R. M. BERGSTEIN   2,411,144
METHOD OF MAKING KNOCK-DOWN BOXES AND
IMPROVED CARTRIDGE CONTAINERS
Filed Nov. 3, 1941   9 Sheets-Sheet 1

INVENTOR.
ROBERT MORRIS BERGSTEIN.
BY Allen & Allen
ATTORNEYS.

Nov. 19, 1946.  R. M. BERGSTEIN  2,411,144
METHOD OF MAKING KNOCK-DOWN BOXES AND
IMPROVED CARTRIDGE CONTAINERS
Filed Nov. 3, 1941　　9 Sheets-Sheet 2

INVENTOR.
ROBERT MORRIS BERGSTEIN,
BY Allen & Allen
ATTORNEYS.

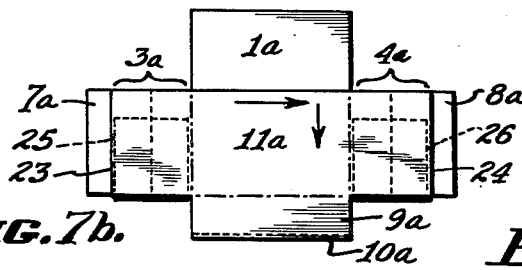
FIG. 7b.
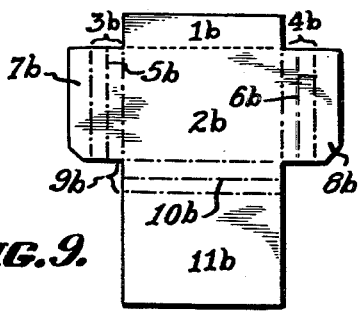
FIG. 9.
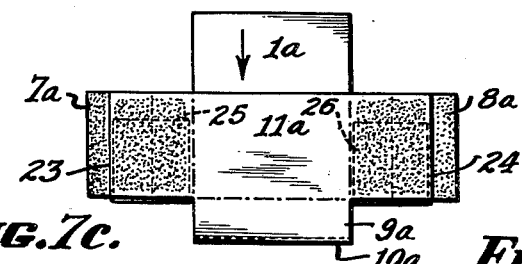
FIG. 7c.
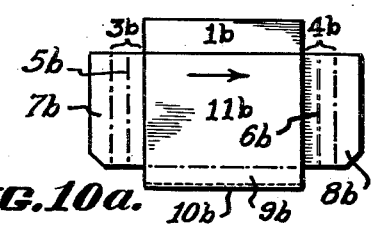
FIG. 10a.
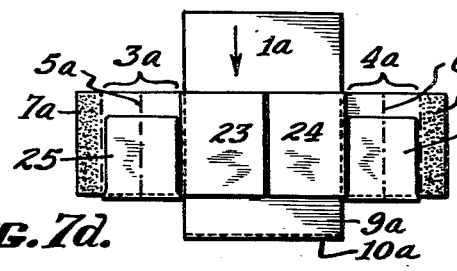
FIG. 7d.
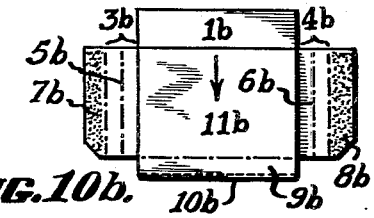
FIG. 10b.
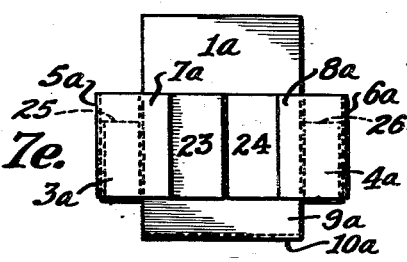
FIG. 7e.
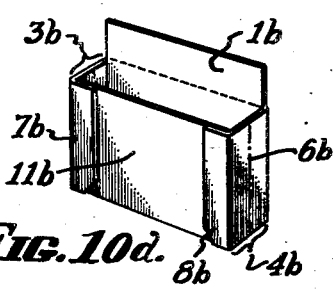
FIG. 10c.
FIG. 10d.
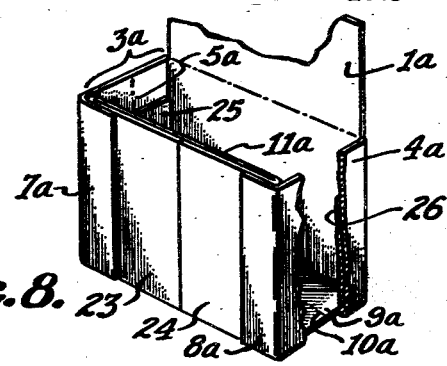
FIG. 8.
INVENTOR.
ROBERT MORRIS BERGSTEIN.
BY Allen & Allen
ATTORNEYS.

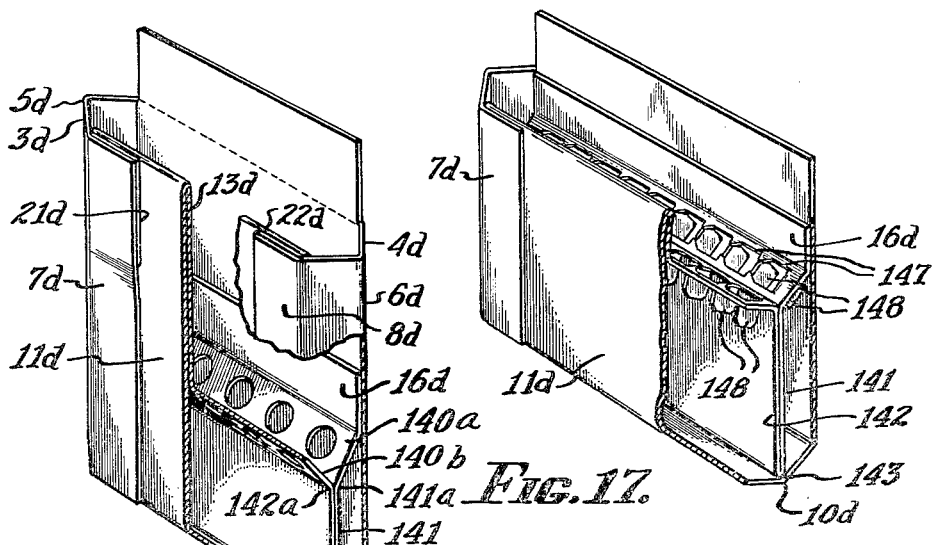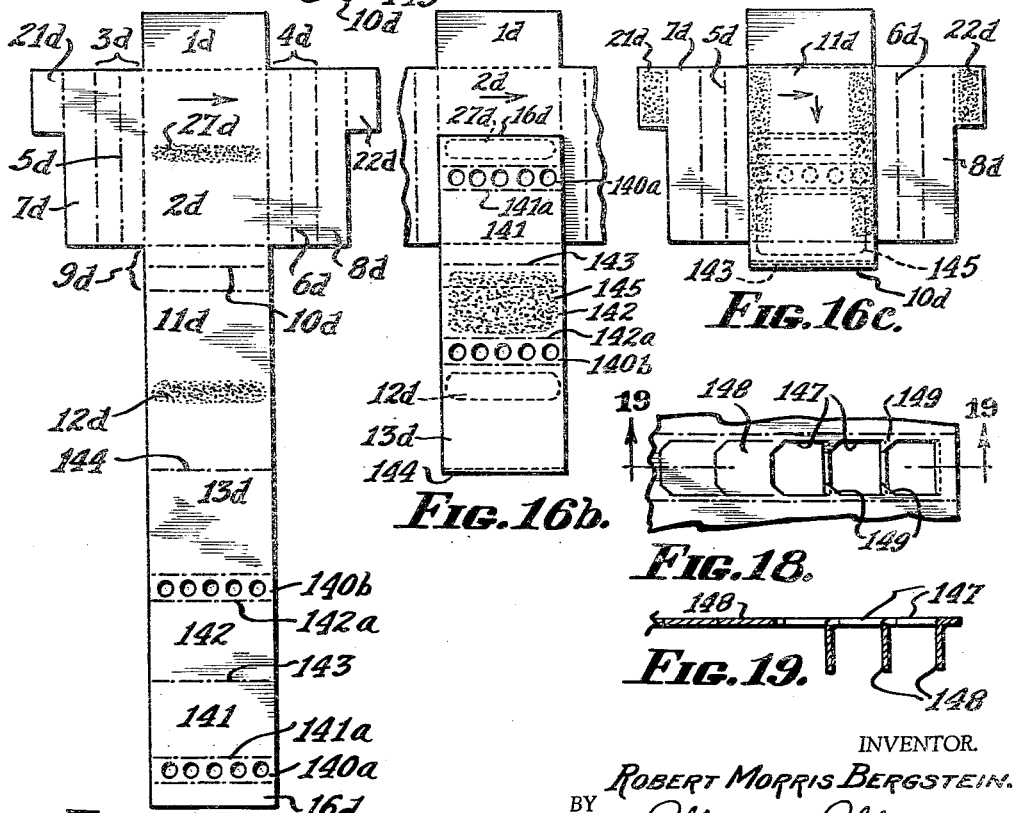

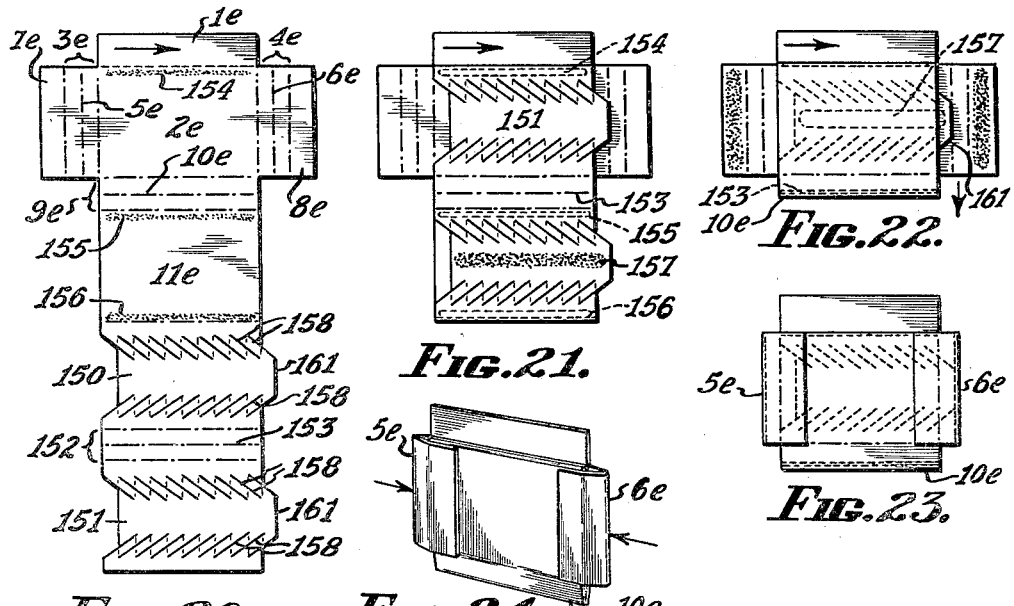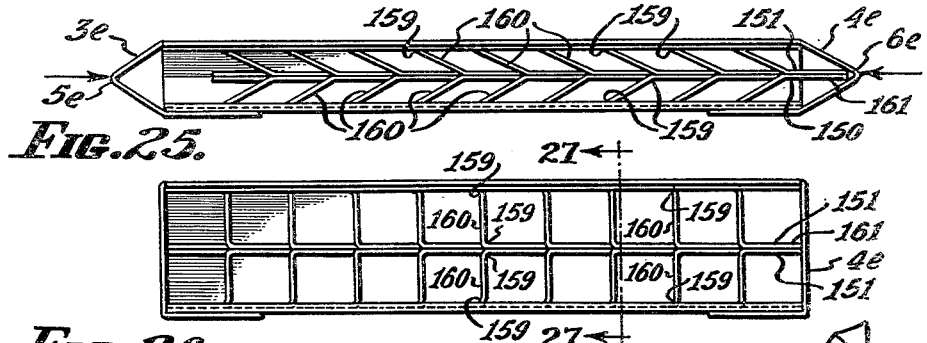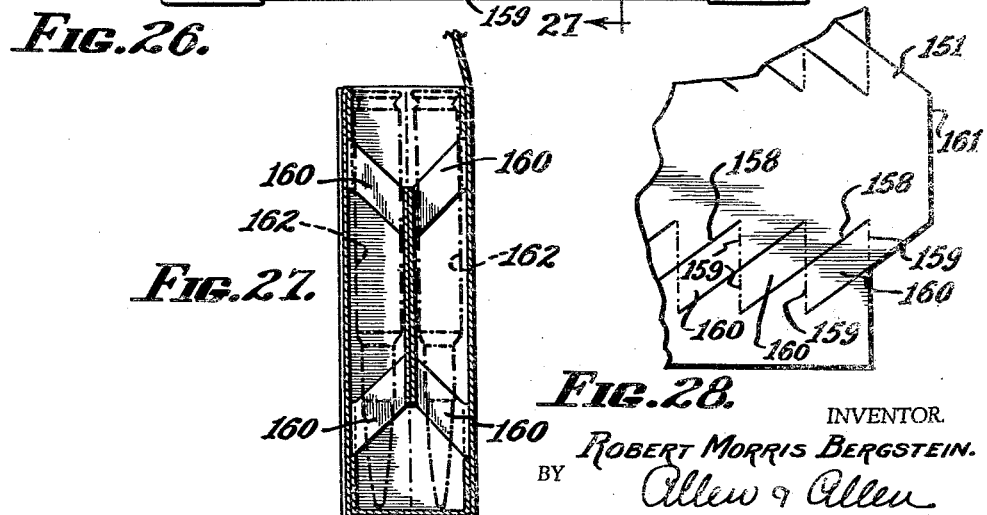

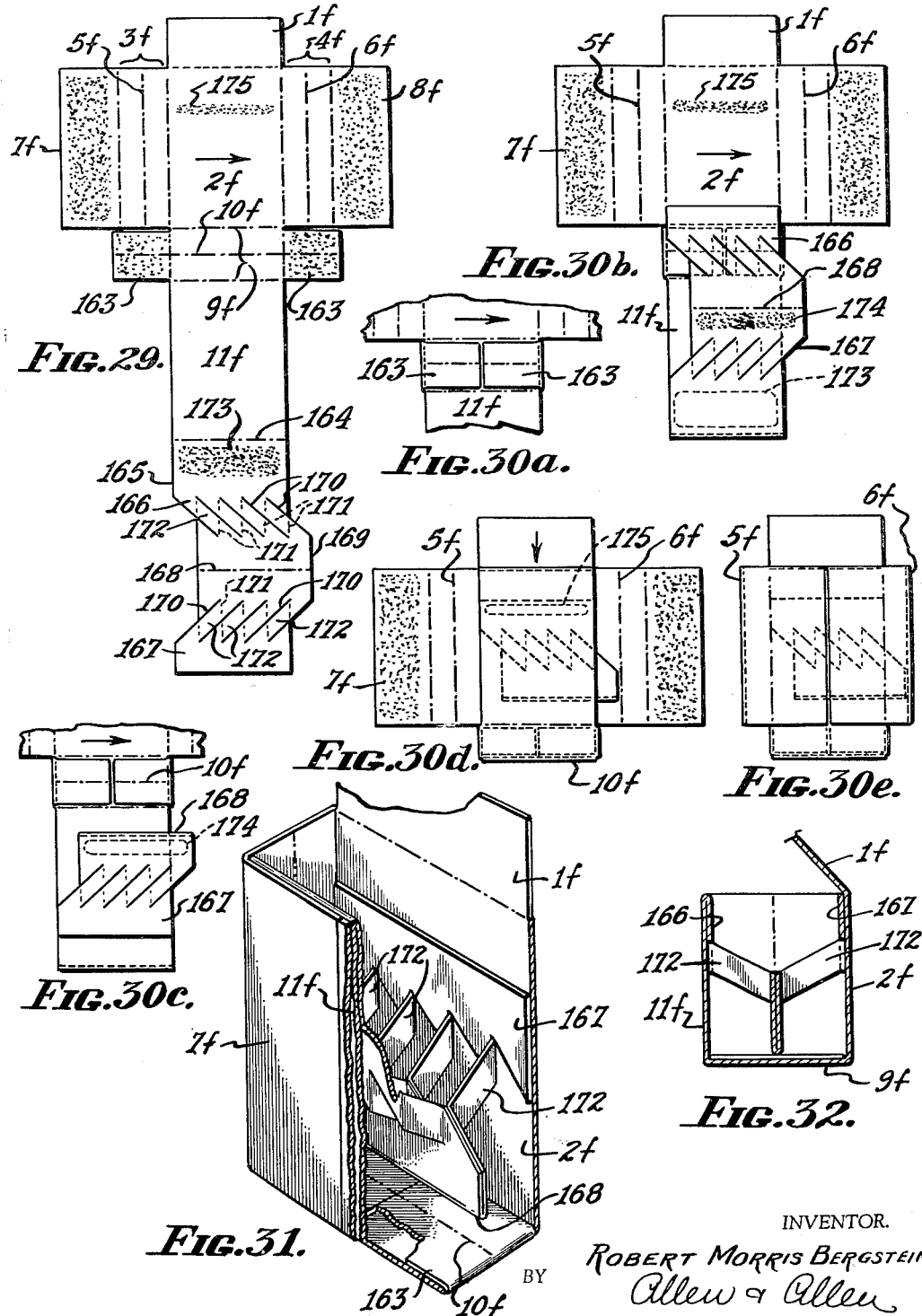

Nov. 19, 1946.   R. M. BERGSTEIN   2,411,144
METHOD OF MAKING KNOCK-DOWN BOXES AND
IMPROVED CARTRIDGE CONTAINERS
Filed Nov. 3, 1941   9 Sheets-Sheet 9
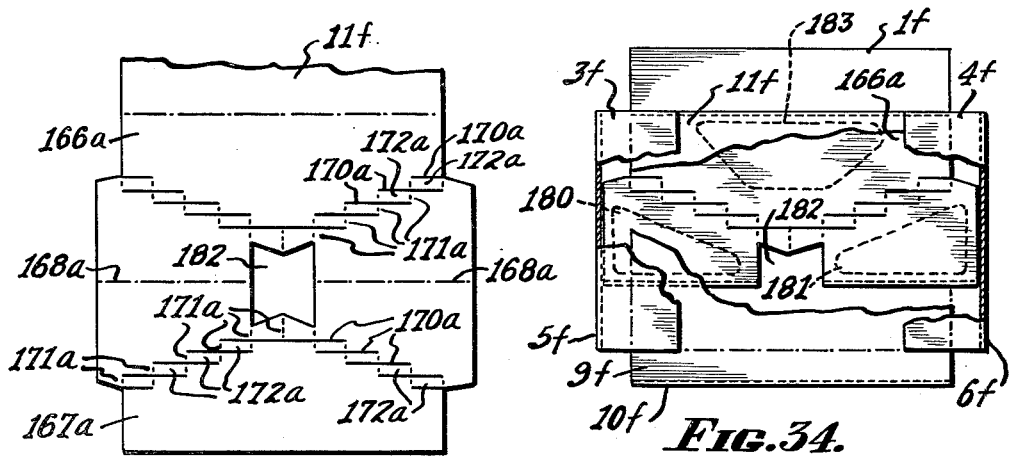
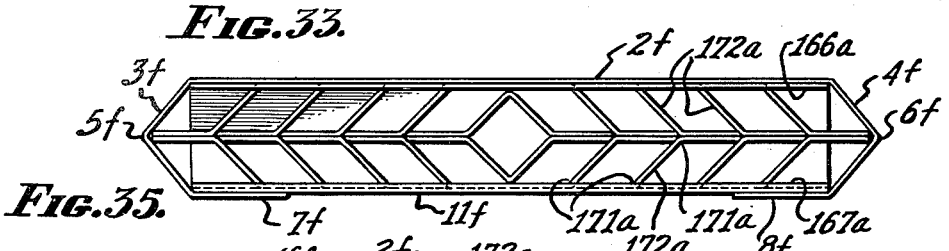
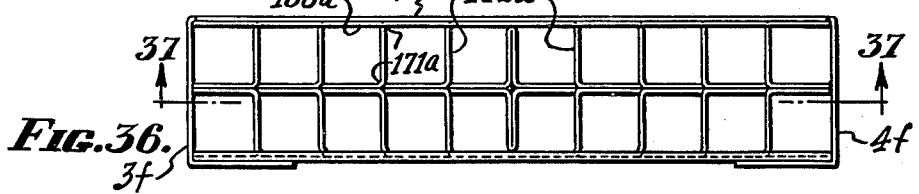
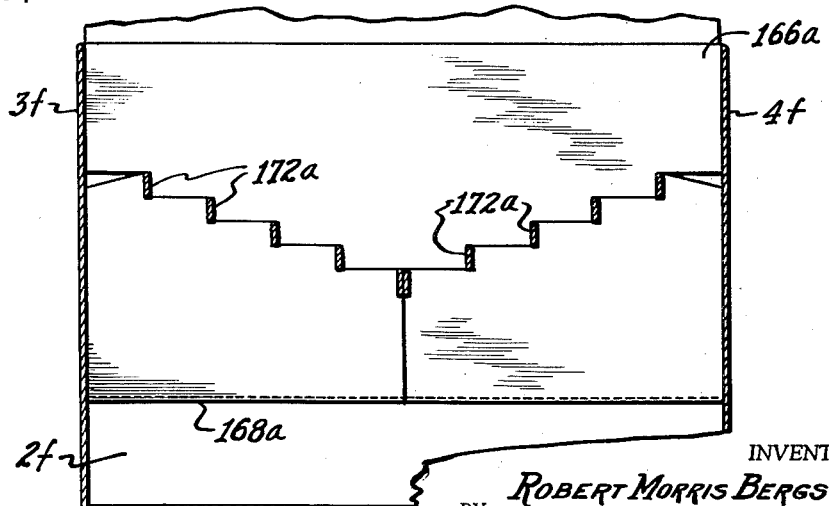
INVENTOR.
ROBERT MORRIS BERGSTEIN.
BY Allen & Allen
ATTORNEYS.

Patented Nov. 19, 1946

2,411,144

UNITED STATES PATENT OFFICE 2,411,144

METHOD OF MAKING KNOCKED-DOWN BOXES AND IMPROVED CARTRIDGE CONTAINERS

Robert Morris Bergstein, Cincinnati, Ohio

Application November 3, 1941, Serial No. 417,622

6 Claims. (Cl. 93—49)

The increased production of small arms ammunition has brought forward many new problems in the packaging of these items, such as .30-caliber and .50-caliber cartridges. Many of the cartridge cartons and containers now in use are made in set-up form, which is a slow and costly process and is often not adapted to large volume requirements. From another standpoint, containers now in use for packaging ammunition of a certain type require separate partitions. This adds another slow and costly operation, and one poorly adapted to high speed production packaging.

My invention as herein disclosed eliminates these inherent defects, and high speed production of the boxes themselves is made possible, as well as the provision of boxes that are adapted to high speed modern filling and loading operations. It is an object of my invention to achieve the production of knocked-down containers adapted for ready erection for the packaging of cartridges and the like, at high speed, by a series of gluing and folding operations, without the necessity of first erecting the container and thereafter flattening it. A still further object of my invention is to make possible the production of tapered or other odd shaped container such as the bandolier pockets required for Garand or Springfield rifle clips, by this same type of high speed operation. A still further object of my invention is to achieve such production in multiple units, thereby increasing still further the speed of manufacture. A still further object of my invention includes the providing of one piece knocked-down containers having a suitable partition forming an integral part thereof which is automatically squared up in a loading position as the container itself is squared up, the production of such integrated partition in the containers by successive high speed gluing and folding operations, and to provide a means whereby varying thicknesses of stock in the glue seam are compensated for, to assure secure and dependable adhesion. These and other objects of my invention will become more apparent as the description thereof proceeds, reference being had to the claims appended hereto as to the nature and scope of the invention.

Referring now to the drawings:

Figs. 7a through 7e show successive stages of folding and gluing of the blank shown in Fig. 6.

Fig. 8 is a perspective view of the box produced from the blank of Fig. 6, squared up.

Fig. 9 shows a type of blank alternative to the blank shown in Fig. 6.

Figs. 10a through 10d show the successive folding and gluing operations of the blank shown in Fig. 9, Fig. 10d being a perspective of the box in erected position.

Fig. 15 is a perspective illustrating a modification of the container shown in Figs. 1 through 4, the containers being in partly erected position.

Figs. 16a through 16c illustrate the blank and certain folding operations incident to forming the container of Fig. 15.

Fig. 17 is a perspective showing in partly erected position a container embodying the principles of the container of Fig. 15, but being of different proportions and having a modified inner partition.

Fig. 18 is an enlarged fragmentary plan view illustrating how the modified inner partition of Fig. 15 is produced.

Fig. 19 is a section taken along line 19—19 of Fig. 18.

Figs. 20, 21, 22 and 23 illustrate a blank and a sequence of folding and gluing operation performed thereon to produce a further modified type of container.

Fig. 24 is a perspective showing the container formed from the blank of Fig. 20 in its flat or knock-down form.

Fig. 25 is an enlarged top plan view of the container shown in Fig. 24, but in partly erected position.

Fig. 26 is a view similar to Fig. 25 but showing the container completely erected.

Fig. 27 is a section taken along line 27—27 of Fig. 26.

Fig. 28 is an enlarged fragmentary portion of the blank of Fig. 20.

Fig. 29 is a plan view of another alternative blank.

Figs. 30a through 30e illustrate consecutive steps in folding the blank of Fig. 29.

Fig. 31 is a perspective showing the container produced from the blank of Fig. 29.

Fig. 32 is a sectional view illustrating a container similar to the container of Fig. 31 but of modified proportions, and Figs. 33 through 37 illustrate a further modification of the container.

Figure 1:
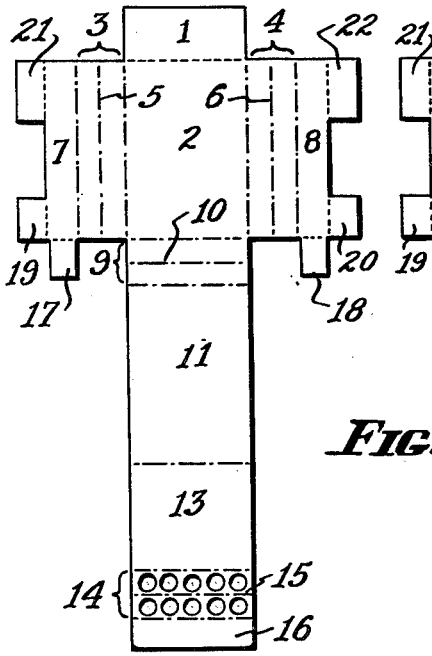
Figure 1 illustrates one form of my integrated partition blank.

Referring now to Fig. 1. The blank shown is preferably made from cardboard or other semi-rigid material of this nature, with the various panels and walls thereof as shown, defined by lines of articulation, which lines of articulation may be creases, partially cut scores, or perforations which define the respective panels and flaps, and permit folding thereof.

The blank then shown in Fig. 1 comprises a top flap 1 articulated to the front wall 2. To each side of front wall 2 is articulated a side wall 3 and 4, each of which side walls has as shown a medial line of fold 5 and 6 respectively. These side walls have glue flaps 7 and 8 articulated thereto, and each of these glue flaps as shown in the drawing has three corner tabs articulated to it, which tabs are numbered 17, 18, 19, 20, 21, and 22, respectively.

The bottom wall 9 has a medial line of fold therein indicated at 10. Articulated to the bottom wall 9 is the back wall 11 to which the glue flaps are to be adhered in the course of folding and gluing the carton, as will be subsequently explained. Articulated to back wall 11 is an inner supporting panel 13 and articulated to 13 is the partition panel 14. The particular example now being described has two rows of holes or circular cut-outs indicated in partition panel 14 and between these two rows of holes is a medial fold line 15. Articulated to the partition panel 14 is the partition glue flap 16.

Before proceeding with the description of the folding and gluing operation on the blank, a brief discussion of the terms as used in the description above might be in order. Some of the other forms of the present invention, to be described later, do not involve the use of the corner tabs or the inner partition, but the main structural parts are common to most of the forms of the invention shown, and so far as possible, the same terms will be followed hereafter in describing them. For example the front wall will be considered the main body wall to which the side walls are articulated, whereas the wall to which the glue flaps are adhered will be designated as the back wall. The two opposite walls of the main carton body which have the parallel medial fold lines therein will be referred to as the side walls. It is to be noted that each of these descriptive terms as used above in connection with Fig. 1, and which will be followed insofar as possible in the remainder of this case, are used merely for the purpose of clarity in language and description and are not to be considered as limiting in any way the relative dimensions or the position of the various walls and panels, etc., so referred to.

Figure 2A:
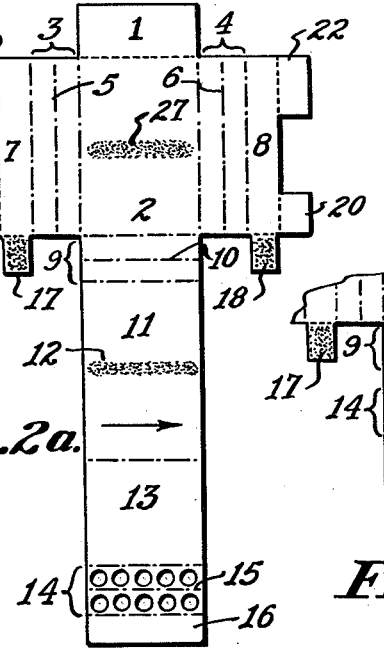
Figs. 2a through 2i illustrate my preferred form of successive folding and gluing operations as applied to the blank illustrated in Fig. 1, the arrows indicating the direction of motion.

Referring now to the diagrammatic series of drawings 2a through 2g, the blank shown in Fig. 1 is moved along in the direction of the arrow indicated in Fig. 2a, and the initial step is preferably the application of adhesive, as designated by the stippled areas, in this drawing. It can be seen that one shaded area 12, extends across the back wall 11, another shaded area 27 extends across the front wall 2 and adhesive has also been applied to the pair of corner tabs 17 and 18 as indicated.

Figure 2B:
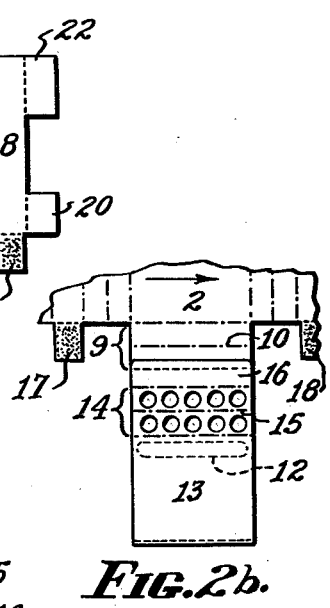

After the adhesive has thus been applied the initial folding step as shown in the preferred method is to fold inwardly the inner supporting panel 13 as shown in Fig. 2b. As this is done, the partition glue flap 16 is preferably restrained slightly from following the complete folding action just described, by means of a properly positioned sword or guide to facilitate the next folding operation.

Figure 2C:
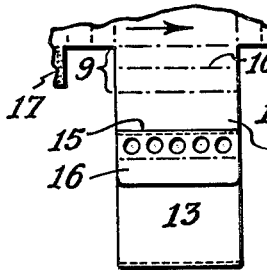

This next folding operation as shown in Fig. 2c consists of folding reversely the outer half of the partition panel, with the glue flap 16 articulated thereto, along the medial fold line 15 of the partition panel.

Figure 2D:
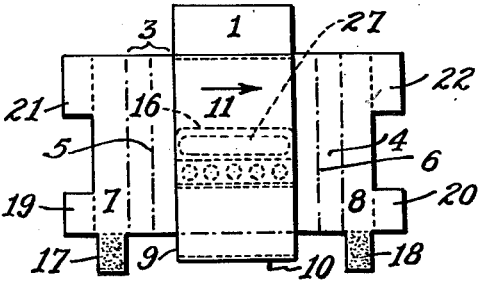

With these folded portions being retained in folded position, the next stage, as shown in Fig. 2d, is to fold inwardly along the medial fold line 10 of the bottom wall 9.

Figure 2E:
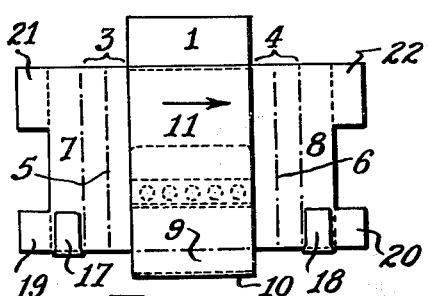

Thereafter as shown in Fig. 2e, the projecting corner tabs 17 and 18 are folded inwardly to overlie respectively the glue flaps 7 and 8. It can be seen in Fig. 2d that these corner tabs project outwardly beyond the medial fold line 10 of the bottom wall, so that with a fixed sword or shaped member it is relatively simple to pick up the ends of the corner tabs 17 and 18 and fold them inwardly to the position of Fig. 2e.

Figure 2F:
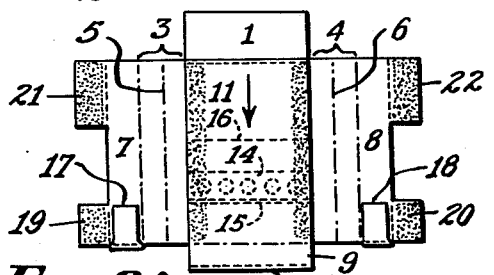

Thereafter, as illustrated by the arrow in Fig. 2f the position of the carton in relation to its direction of motion is changed, the carton now being moved parallel to the lines of fold defining the side walls. In this new orientation adhesive is again applied in the areas as indicated by the stippled portions. As shown in this figure the adhesive application covers the remaining two pairs of corner tabs 19 and 20, 21, and 22, as well as the upper surface of the two portions indicated on the back wall 11.

Figure 2G:
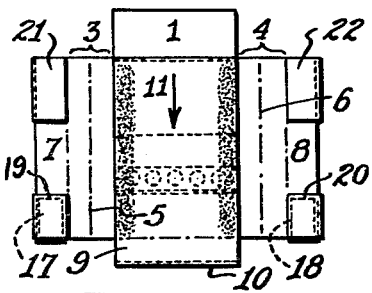

Subsequently, as shown in Fig. 2g, these two remaining pairs of corner tabs 19, 20, 21 and 22 are folded inwardly, with tabs 19 and 20, overlying the previously infolded tabs 17 and 18 and the tabs 21 and 22 overlying the glue flaps 7 and 8 respectively.

Figure 2H:
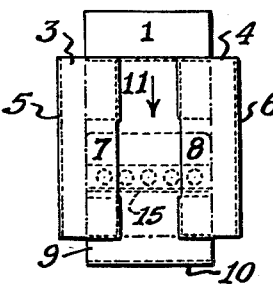

Subsequently, as shown in Fig. 2h, the folding is carried out along the two medial fold lines 5 and 6 of the side walls, completing the operation.

Figure 2I:

Shown in Fig. 2i is a diagrammatic representation of a conventional stacker, where the folded and glued boxes are placed under pressure to secure adhesion.

Figure 3:
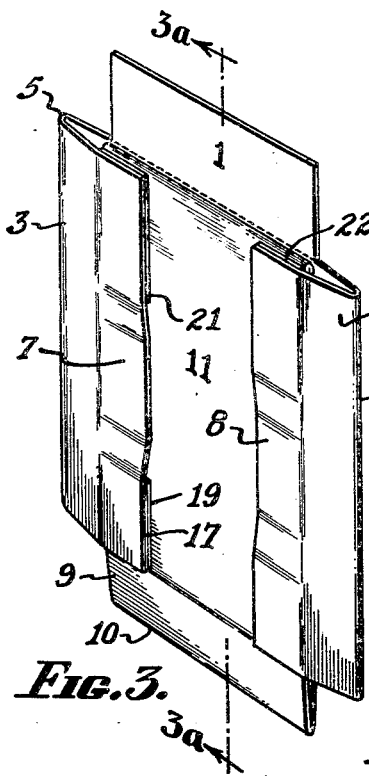
Fig. 3 is a perspective showing the knocked-down box of Fig. 2h in which form it is shipped to the arsenal or point of loading.

Fig. 3 shows the folded glued box in knocked-down form just as it comes out of the pressure conveyor shown in Fig. 2i, in which form the box is shipped to the plant where the filling operation is to be performed. As seen in this drawing the container is in flat knocked-down form, providing a compact article which can be shipped and stored efficiently and economically.

When it is desired to pack or fill this container, it can be squared up instantly for use merely by pressing inwardly on the two outer sides, that is, on the two medial fold lines 5 and 6 of the side walls. The result of so squaring up the container is pictured in Fig. 4, where it will be seen that not only does this one simple motion square up the body of the container itself, but likewise serves to bring up into position substantially at right angles to the main body walls the bottom wall 9 of the container, and simultaneously also brings up into transverse position substantially at right angles to the main body walls, the partition panel 14. Thus, by a single simple motion, the complete container is squared up ready for packing.

Figure 5A:
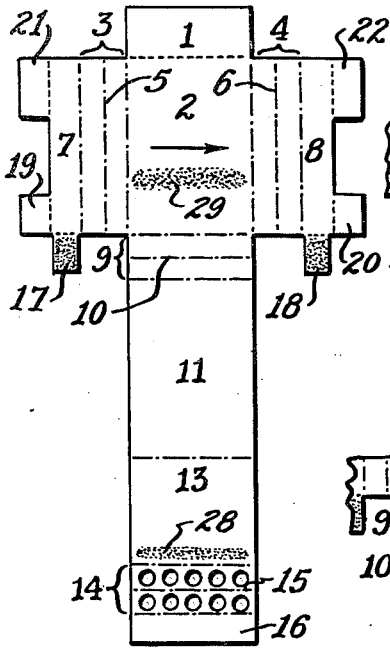
Figs. 5a through 5e show a portion of a series of folding and gluing operations which may be performed on the blank of Fig. 1, to produce the alternate folded arrangement of the panels as shown in Fig. 3b.

Figs. 5a through 5e show the initial stages of an alternate series of folding and gluing operations for the same blank illustrated in Fig. 1. Again the arrows indicate direction of motion, and Fig. 5a illustrates the preferred initial step of adhesive application. As shown by the shaded areas in this figure, this includes an adhesive application 28 to the inner supporting panel 13 adjacent to the line of articulation of the partition panel 14 and the application of adhesive to an area 29 shown on wall 2 and likewise the application of adhesive to the corner tabs 17 and 18.

Figure 5B:
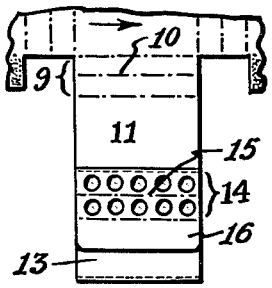

Next, as shown in Fig. 5b the inner supporting panel 13 is folded inwardly.

Figure 5D:
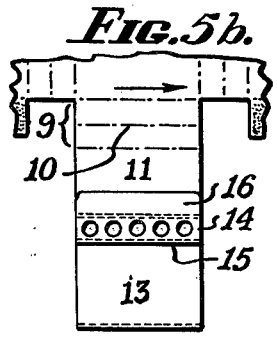
Figure 5C:
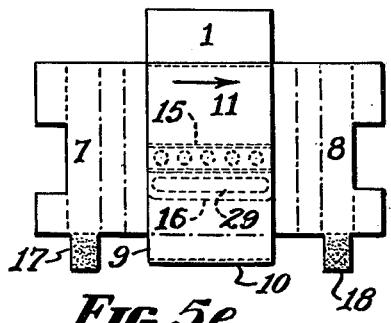
Figure 5E:
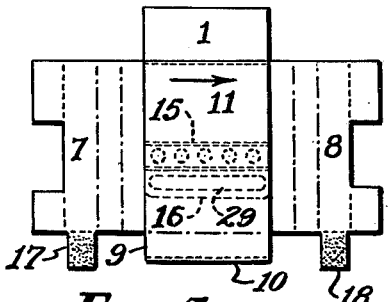

As shown in Fig. 5c the partition panel 14 is now folded reversely, along its line of articulation to the inner supporting panel 13.

Next as shown in Fig. 5d, the outer portion of the inner supporting panel and the glue flap 16 are folded forwardly, along the medial line of fold 15 of partition 14.

The next step consists of retaining the folded portions in folded position and folding over along the medial fold line 10 of the bottom panel 9 which folding corresponds to the step illustrated in Fig. 2d of the previously described sequence. From this point on the folding and gluing operations follow in the same order as previously described in connection with 2d through 2g, and it is therefore not necessary to repeat these again here.

Figure 3B:
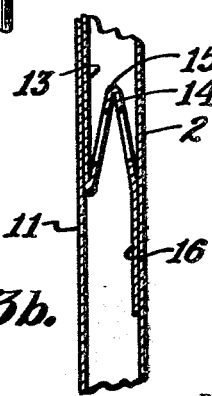
Fig. 3b is a fragmentary section similar to Fig. 3a, but illustrating an alternate folded arrangement of the panels as produced by the method of Figs. 5a through 5e.
Figure 3A:
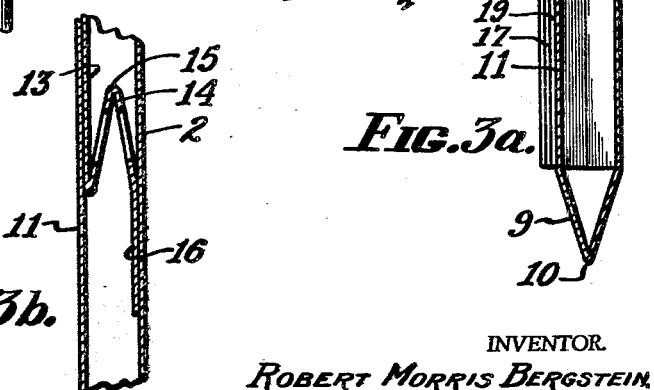
Fig. 3a is an enlarged section taken along line 3a—3a of Fig. 3, but with the box in partly erected position to more clearly illustrate the folded relation of the various panels.

It can be seen that substantially the same results are produced by the alternate method above as by the preferred method previously described, the finished product in each case being substantially identical except that by the preferred method, as illustrated in Fig. 3a, the inner partition 14 is folded in a downward V in relation to the top or open end of the box, whereas, in the alternate method just described this partition, as illustrated in Fig. 3b, is folded in an upward V shape, along its medial fold line 15, in relation to the top or open end of the box.

Even in the initial stages of the folding and gluing it will be apparent that there is a close relationship between my alternate and preferred method. In both instances the initial fold is that of folding inwardly the inner supporting panel, and the subsequent fold is a reverse folding action along a folded line located in the portion initially folded inwardly. Thereafter both involve the retention of this compound fold, that is, at least one regular fold and one reverse fold, while the sections so retained are folded inwardly along the medial score line of the bottom wall of the box. Subsequent to this folding, the operation of folding and gluing may be identical in both cases, as previously noted.

A more detailed discussion of the corner tabs 17, 18, 19, 20, 21 and 22 is now in order. The primary purpose of these tabs as may be noted broadly, is to secure dependable adhesion. To go into somewhat more detail, the customary means of applying pressure to secure adhesion in folding box gluing and folding machinery is to deliver the folded and glued containers on a slow moving canvas belt under overhead pressure belts, the cartons being stacked in lapped or offset relation between the opposite belts just described with the combination of time and pressure so applied in this conveyor providing the means whereby the adhesion of the seams is accomplished.

With such an arrangement if certain areas or portions of the folded carton have a greater thickness than other portions, this thicker portion tends to relieve the pressure from the portions of less thickness, so that it is difficult (if not impossible) to secure adhesion between areas of a folded carton where there are fewer thicknesses of board, particularly if these adjoin areas where there are more thicknesses or layers of board. As a matter of fact even in other types of pressure conveyors, which would hardly be practical for a box of this type, where the folded and glued blanks are stacked vertically to produce some pressure thereon, this same principle holds true that either in a straight or a lapped stack an area of greater thickness in the folded blank tends very decidedly to relieve or take away any pressure from being applied to areas of lesser thickness.

Referring back now to my preferred method for a moment and the drawings illustrating it, a study of the container as it appears in Fig. 3a will reveal the following condition. Starting with the medial fold line 10 of the bottom wall of the carton, the area over the main body of the carton, between this medial fold line and the reversely folded medial fold line 15 of the partition 14 comprises two layers or thicknesses of board. From the reversely folded medial fold line 15 to the end of the partition glue flap 16 there are four thicknesses of stock. Then from the end of glue flap 16 to the line of fold at the top of the carton, there are three thicknesses of board.

Now, by the introduction of the corner tabs in the number and position, as described, it will be apparent that this very difficult problem of the varying thicknesses present has been completely overcome. The superimposed tabs 17, 18, 19 and 20 produce two extra layers at the portion adjoining the base. The tabs 21 and 22 introduce an extra layer of stock in the upper portion as just described in the preceding paragraph. The result, therefore, is that the folded carton as seen in Fig. 2h for example has a total of five layers of board for substantially the complete length of the two parallel areas of panels 7 and 8 which are to be seamed, that is, secured by adhesion, so that as the cartons go into the pressure conveyor shown in Fig. 2i, the thickness of the carton over the vital areas of adhesion have been equalized, insuring adequate pressure on all such areas to secure a uniform and dependable adhesion of the seams.

It is also to be noted that the arrangement of these tabs is such that their folding can be carried out along lines parallel to the direction of the motion in which the blank is travelling, thus simplifying the operation and involving no extra manufacturing cost to achieve this desired result. It may also be noted that in this particular form two tabs are folded and glued in the first direction of motion and four tabs are glued and folded in the second direction of motion, and one pair of this last mentioned four are folded and glued over the first mentioned pair.

While the description and the operation thus far has been confined to the folding and gluing of one blank at a time, we may if desired readily double up these units, doubling the output thereby. To achieve this, the blanks may be joined together by lines of perforation or other lines of severance along the outer edge of the top panel 1. The two blanks thus joined are thereupon processed as a unit, duplicate operations being performed on each blank on either side of the line of severance just noted.

The methods above described may be carried out on several different types of mechanism with only minor modifications. One such general type of mechanism well adapted to this purpose is that disclosed in Samuel Bergstein's Patents #1,926,364, September 12, 1933; 1,974,408, September 25, 1934 and 2,149,111, February 28, 1939.

With such machines, my method herein disclosed can be readily accomplished, with necessary minor adjustments of the folding devices; the first series of parallel folds being carried out on the first angle of these machines and then after the direction of motion has been changed and the blank is traveling down the second angle or in the second direction, the remaining series of folds are accomplished. It is also within the province of my invention, if desired, to follow my method on the blank of my invention by utilizing two separate straight line gluing and folding machines. In such a case for example, the initial series of folds and gluing is accomplished on one machine, of a straight line type, and thereafter the blank in folded position as delivered from the first machine is placed in the second machine in a re-oriented position and the remaining folding and gluing operations carried out therein.

Or if desired, a combination of straight line and right angle machine might be utilized if desirable. It is feasible for example, to provide blanks such as described above either in single or in double units, pass them through a straight line folding and gluing machine of the standard type to fold over and glue down the inner supporting panel or panels and thereafter take such blanks with these folds retained and accomplish the remainder of the folding and gluing in the right angle type gluing machine such as mentioned above.

There are many novel features inherent in my blank and process for folding and gluing same, as described, aside from the features of the particular corner tabs described, and it is to be understood that I do not wish to be confined or limited by the presence of the corner tabs or by their particular location or order of folding. In the preceding description, for example, a series of folds in the initial direction of motion up to the fold of the medial line of the bottom wall of the carton is described as being carried out in advance of the folding of the first pair of corner tabs, and it is obvious, for example, that if desired, the corner tabs could be folded in first, and thereafter the other folding operations carried out as described. As previously mentioned, a common, and important feature of both my preferred and alternate methods as outlined above consists of making the fold of the inner supporting panel and a second reverse fold, thereafter retaining this compound fold in folded position prior to the final folding down of what would be the line of the base of the carton.

Among the structural features of this form of my invention which are worthy of special note are the following:

The base or bottom 9 of the carton is a solid panel with no glue seam. In packing heavy articles such as cartridges, this is a feature of importance. By providing the two vertical glue seams on the outside of the main carton body there is no interference or obstruction either with the partition or with the contents to be packed. From the standpoint of utility the advantages of this automatic carton which can be squared up in a single motion and which provides automatically thereby a squared up interior partition ready for loading, are also readily apparent. From the standpoint of labor and material and separate assembly cost, the usual type of cross-connected or bellows partitions, which have heretofore been made separately and then inserted in an outer carton, obviously involves much more labor as well as material and handling cost.

My container, due to the features above explained, is particularly well-adapted to automatic loading. When a separate, or inserted, partition such as mentioned in the preceding paragraph is used, as has been the widespread practice the position and retention of the partition in the outer carton is not fixed and secure. The inner partition of my container, as described, is not only an inherent and integral part of the outer carton itself, but it is firmly adhered in position, and cannot slip or come out of place, but is always in a fixed predetermined location and position, and rigidly held there, when the carton is opened; these factors plus the simplicity and automatic feature of the entire package, make it uniquely and particularly adaptable to automatic machinery for the loading of shells and cartridges.

Figure 6:
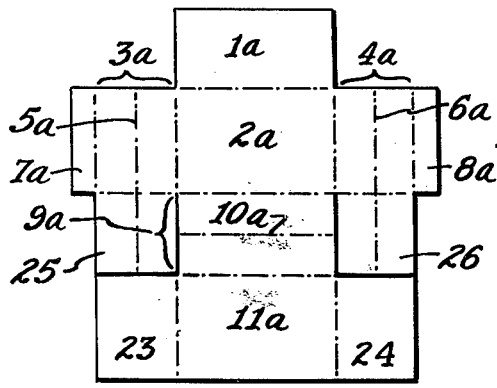
Fig. 6 shows another type of blank made according to my invention, without the internal partition.

In Fig. 6 I have illustrated an alternate form of blank, which has no interior partition. The box as formed from this blank and as seen in Fig. 8 is adapted to the packaging of cartridges which are already gripped in clips, like the Garand or Springfield clips, and therefore require no interior partition.

Referring again to Fig. 6 the blank shown is similar in many respects to the previous form described and consists of a top flap 1a, front wall 2a, side walls 3a and 4a having medial lines of fold therein 5a and 6a, bottom wall 9a having a medial fold line 10a and a back wall 11a. However, as shown there are wings 23 and 24 articulated to the back wall 11a and inner corner flap 25 and 26 respectively articulated to the side walls 3a and 4a.

Figure 7A:
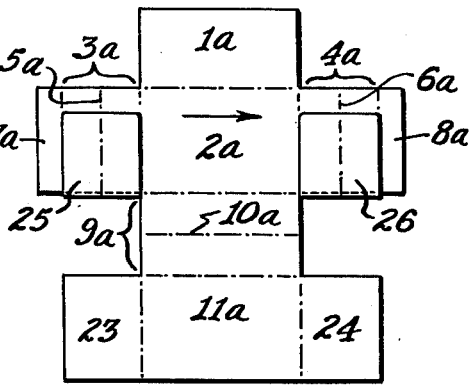

Figs. 7a through 7e illustrate successive stages of folding and gluing of the blank just described, the direction of motion being preferably as indicated by the arrows shown. In Fig. 7a the initial folding as shown is the folding in of the two inner corner flaps 25 and 26 respectively.

The next fold as shown in Fig. 7b consists of an inward fold along the medial fold line 10a of the bottom wall of the box.

Now with these folds retained in folded position the direction of motion in relation to the position of the blank is changed as indicated by the arrow.

In this new orientation the first step preferably is the application of adhesive, and as indicated by the stippled portions in Fig. 7c this consists of applying adhesive to the upward facing surface of the wings 23 and 24 as well as to the upward facing surface of the glue flaps 7a and 8a.

As not illustrated, but as will be readily understood, the next step consists of depressing either by a sword or other fixed member the extending side walls 3a and 4a. Since these walls project, this depressing can be readily accomplished by a properly positioned fixed folding member and the purpose of so depressing these walls is to provide a clearance space beneath the wings 23 and 24 whereby a folding member can be arranged to engage under these wings to turn them inward.

This inward turning of wings 23 and 24 is shown in the Fig. 7d which shows the wings folded in to be adhered to the panel 11a.

The final fold to complete the box is illustrated in Fig. 7e which fold consists of turning in the side walls 3a and 4a, and the overlying infolded inner corner flaps 25 and 26, along the medial lines of fold 5a and 6a. The result of this folding operation is clearly shown, and in this glued and folded form the carton is preferably placed under pressure to secure adhesion.

In passing, it might be noted that as an alternative I may, if desired, fold the wings 23 and 24 inward, instead of outward, i. e. have these auxiliary wings 23 and 24 folded under the back wall 11a. In this event the wings will be folded prior to the folding of back wall 11a, and would preferably be the width of the side walls and would not be adhesively secured to the rear wall 11a. In this alternate form it is apparent that the wings will still serve the purpose of providing an extra thickness of material adjacent to the glue flaps to help provide assured adhesion and it will be apparent that when a box so constructed is squared up these internally folded but unglued wings can be opened parallel to the side walls 3a and 4a, providing an extra thickness of stock at the sides of the box to add reinforcement and make the finished box more rigid.

Fig. 8 shows the finished container as produced by the preceding series of steps in squared up position. It should be noted that the inner corner flaps 25 and 26 are shown in upstanding position, but will fall into a position at right angles to the walls to which they are articulated, of their own accord as the container is squared up, but if necessary, these can readily be manipulated into desired position. The flaps 25 and 26 will thus serve to reinforce the bottom of the container.

In regard to the wings 23 and 24, as described above, it should be noted that as shown in the drawings these may extend sufficiently far so as to meet when folded across the back wall, thereby bracing the container and contributing to its strength. It is obvious, that if desired, shorter wings could be used and also that in addition to their reinforcing characteristics these wings may provide additional thicknesses of material, to facilitate pressure in a drying conveyor, as previously described in connection with the corner tabs employed in the container of Figs. 1 through 4.

It might be noted at this point that if desired these wings, such as described in connection with the form above, might be used on the partition type container described in Fig. 1 to form a single continuous wing on either side, or on a portion of either side, of the rear wall, either alone or in connection with inner tabs as described.

The blank shown in Fig. 9 is a modification of the blank shown in Fig. 6, eliminating the wings 23 and 24 and the inner corner flaps 25 and 26.

The operations of folding and gluing the blank shown in Fig. 9, are illustrated in Figs. 10a to 10c. Initially the folding is along the medial fold line 10b of the bottom wall while the blank is carried in the direction indicated by the arrow in Fig. 10a.

Thereupon the direction of motion is changed in relation to the position of the blank, and adhesive is applied to the upper surface of the glue flaps 7b and 8b as shown by the stippled portions in Fig. 10b, or, if desired, the adhesive may be applied to the corresponding meeting surfaces of the back wall 11b. Thereafter as shown in Fig. 10c the outer portion of the two side walls and the glue flaps are folded over along the medial lines 5b and 6b completing the operation. In this glued and folded state the blanks are put under pressure to secure adhesion. The erected box thus formed is shown in Fig. 10d.

Figure 11:
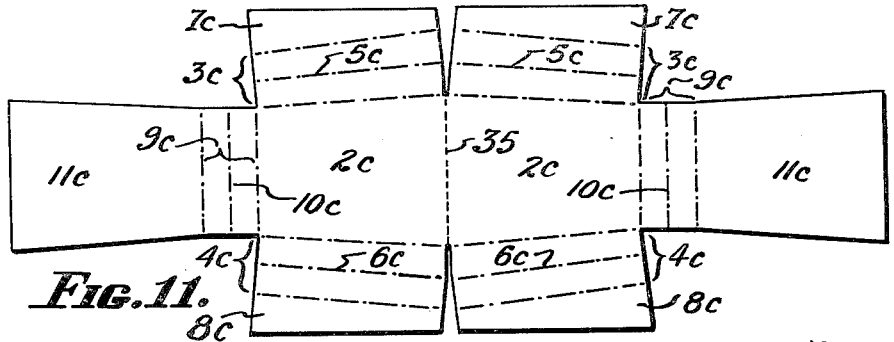
Fig. 11 illustrates two tapered types of blanks, articulated by a line of perforation.

In Fig. 11 are illustrated two blanks with a tapered or pyramid shape, secured together by a line of severance 35. As shown in the drawings, each blank comprises a front wall 2c, side walls 3c and 4c having medial score lines therein 5c and 6c and articulated to these side walls are glue flaps 7c and 8c. There is a bottom wall 9c having a medial fold line 10c therein, and a back wall 11c.

The folding and gluing operation begins with taking this multiple unit in the direction of motion indicated by the arrow, and folding each unit along its base medial line 10c. In this folded position the carton is as illustrated in Fig. 12a.

Figures 12A, 12B:
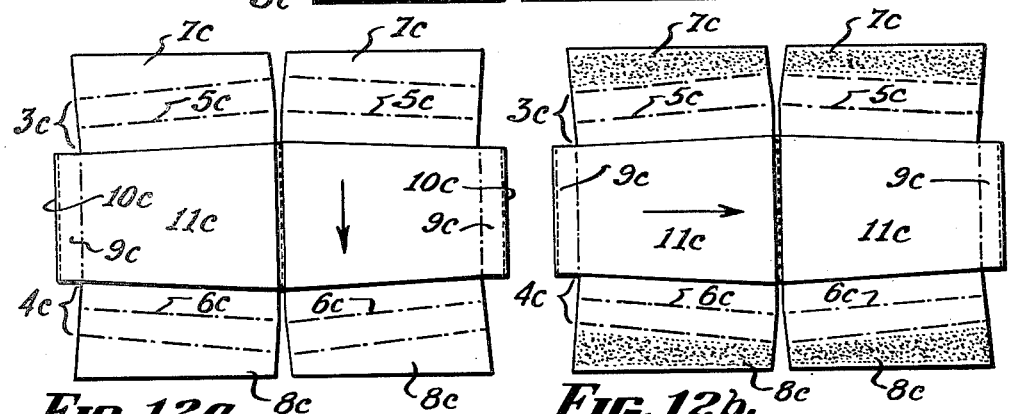
Figs. 12a through 12c illustrate successive stages in the folding and gluing of these multiple-unit blanks shown in Fig. 11.
Figure 12C:
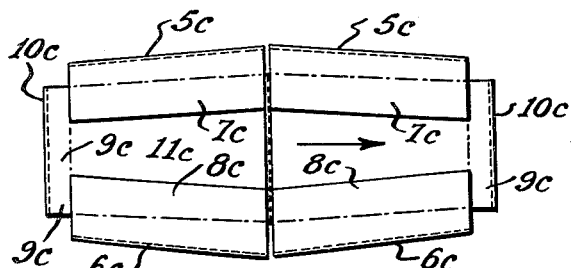
Figure 13:
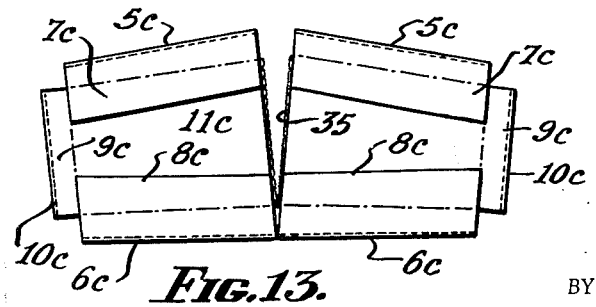
Fig. 13 illustrates a multiple unit produced by the operations of Fig. 12, as the units appear when torn apart.

Now the position of the carton in relation to its direction of motion is changed, as indicated by the arrow in Fig. 12b and in this new orientation the first step is the application of adhesive, which is indicated by the shaded areas, onto the upwardly facing surface of the glue flaps. It is here again apparent that, if desired, adhesive might be applied to the corresponding meeting surface of the back wall. Next, as shown in Fig. 12c, the side walls are folded in along the medial lines of fold therein and in this position the cartons are put under pressure to secure adhesion. If desired, upon emerging from the pressure conveyor the carton can be torn apart, as indicated in Fig. 13, into the two individual units, or they can be left together to be severed at the point of packing if desired.

Figure 14:
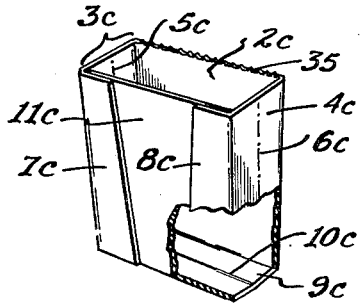
Fig. 14 illustrates one of the individual units shown in Fig. 13 as it appears in perspective when squared up.

Fig. 14 illustrates this carton in squared up position, and as in the previously described cartons, this is accomplished merely by pressing in the two medial fold lines on the opposite side walls. It can be noted clearly in this figure that the shape is a pyramidal or a tapered shape with the large end being the open end. This type of paper pocket is particularly adaptable to be used in carrying two loaded Springfield clips or a single Garand rifle clip, for the purpose known as bandolier pockets which are inserted into the canvas pockets of ammunition belts.

Several particular points in connection with the tapered container should be noted. In the second direction of motion the folding in along medial lines is carried out along lines that are slightly at a bias to the actual motion of the carton itself, due to the shape of the carton. By the use of proper overhead supports these folds can be readily accomplished, as the medial score lines form a point of less resistance than the adjoining solid panel areas; and it is advantageous, too, to have these cartons in multiple units as shown.

It should also be noted that the outer edges of the glue flaps have been tapered in a reverse manner to the taper of the carton, thereby squaring up the outer edge of the flat blank. This offset taper of the glue flaps provides a square outer condition of the flat blank which is of great importance in facilitating the accurate feeding and handling of these containers on high speed folding and gluing equipment.

In regard to the glue flaps, a point might be noted in regard to this particular form last described as well as the other forms of my invention disclosed herein. The usual practice in carton making is to attach the glue flaps to the main panels or one of the wide panels of the carton, and adhere it to one of the narrower side panels. This places the glue seam on the side walls, of course.

This procedure is very difficult on narrow cartons such as those required to hold two rows of 30-caliber cartridges. There are two reasons for this:

First, the width of the glue seam is limited extremely, making its retention uncertain; and second, by the usual practice on a narrow carton the problem of folding a very narrow side wall would be encountered which operation is difficult to accomplish accurately on high speed folding and gluing machinery.

Figure 4:
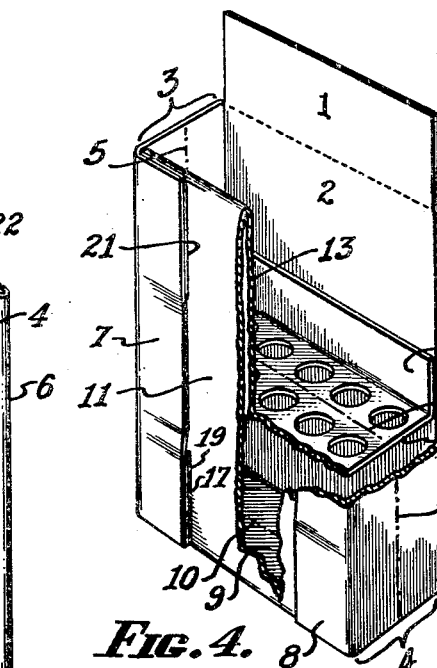
Fig. 4 is a perspective with parts broken away illustrating the knocked-down box of Fig. 3 as it appears when squared-up.

In Fig. 15 I have shown a container similar to the container of Fig. 4 but having a modified partition arrangement comprising suitably perforated panels 140a and 140b joined to panels 141 and 142 by lines of articulation 141a and 142a, the panels 141 and 142 being joined by a line of articulation 143. Referring to Fig. 16a, which shows the blank required for this container, adhesive may be applied to the areas 12d and 27d and with the blank moving in the direction indicated by the arrow, the first fold may be inward about the line of articulation 144. This fold brings the panels to the position of Fig. 16b wherein the glue flap 16d is adhered to the walls 2d by adhesive 27d and panel 13d is adhered to panel 11d by adhesive 12d. With the blank still moving in the direction as indicated, adhesive may now be applied as at 145 to the panel 142, or to a corresponding area of panel 141. The next folding operation will be about the score line 143 which in the position shown, coincides with the medial score line 10d of the bottom panel, to bring the panels to the position of Fig. 16c wherein the panels 141 and 142 are adhered by the adhesive 145.

The direction of travel of the thus folded blank may now be changed and adhesive applied as indicated by the stippled areas after which the tabs 21d and 22d will be turned in to overlie panels 7d and 8d respectively. The final folding, before the blanks are placed under pressure to assure adhesion, will be that of turning the side walls about their medial lines of articulation 5d and 6d so that the glue flaps 7d and 8d become adhered to the panel 11d.

Referring again to Fig. 15, it is to be noted that the panels 141 and 142 form a vertical leg or dividing wall extending beneath the partition members 140a and 140b to the bottom panel 9d. The advantage of the divider thus formed is apparent in that it serves additionally to keep the rows of cartridges apart, and, disregarding the small amount of extra stock required, the construction described does not complicate manufacture or use.

It will be apparent that an underneath glue wheel may be employed for application of adhesive as required to the dividing wall panels, the adhesive application occurring before folding of the blank takes place. It will be apparent that the partition may be located at any height in the carton where it may be desired and also that the center divider panels can extend downward from the partition to the bottom of the box or only a portion of the way toward the bottom. However, as not shown in the drawings but as will be understood, when it is not desired to extend the divider wall completely to the bottom of the box, a different folding sequence than that shown in Figs. 16a through 16c will be required. Referring to Fig. 16b and assuming that the panels 141 and 142 are of less height than those shown, the fold line 143 will not coincide with the medial fold line 10d of the bottom panel but will occupy a position lower than that shown. Thus it will be necessary to next fold the panel 141 reversely from the position shown, after which the next step will be to retain the thus folded panels in that relation and fold forwardly about the medial fold line 10d of the bottom panel to bring the assembly to the position of Fig. 16c after which the final folding is as usual.

Fig. 17 illustrates a box similar to the box of Fig. 15 but having the partition panels located at a proportionately greater height within the container and having an alternate type of openings in the partition itself. Referring to Figs. 18 and 19 the alternate openings are formed by a series of U-shaped cuts 147. The areas of material 148 within these cuts are bent downward as shown, being retained to the panel body by small triangular portions 149.

In the construction of Fig. 17 it is to be noted that no pads or tabs for equalizing the pressure applied during the adhesive setting period are required. This will be apparent from inspection as, taken along the glue flap 7d, the carton embodies five coextensive thicknesses of material. In the container of Fig. 15 the pressure pads 21d and 22d may be employed to compensate for the thickness or layer of material absent near the top of the container due to the lower termination of glue panel 16d.

In the forms of my invention as illustrated in Figs. 20 through 32, I have provided containers having further improved inner partitions and dividing members.

Referring to Fig. 20, the blank here shown has a lid or top panel 1e, front wall 2e, side walls 3e and 4e which have medial score lines 5e and 6e respectively, glue panels 7e and 8e, a bottom panel 9e having a medial fold line 10e, a rear wall 11e to which rear wall is articulated the panels 150 and 151 which embody my improved inner partition and divider member. The panels 150 and 151 are articulated to an intervening panel 152 having a medial score line 153.

Adhesive may be applied to the blank as at 154, 155 and 156 after which the first folding operation may be to the position seen in Fig. 21 where the panels 150 and 151 have been folded forward about their line of articulation to panel 11e, the adhesive areas serving to secure the panels as shown.

With the panels in the position of Fig. 21, adhesive may now be applied to the area 157 of panel 151, or to a corresponding area of panel 150, after which the next folding operation, to position the parts as seen in Fig. 22, takes place upon the fold line 153 which fold line coincides with the medial fold line 10e of the bottom panel. The panels 150 and 151 will thus be secured together by the adhesive 157 at their center portions, that is, the center portions thereof which lie between the diagonal cuts 158. At their outer margins the panels 150 and 151 will be secured respectively to the body panels 11e and 2e by the adhesive areas 154, 155 and 156 before mentioned.

The final folding is illustrated in Fig. 23, where the side walls have been folded inwardly about their medial fold lines 5e and 6e, adhesive having been applied to the glue flaps 7e and 8e or to corresponding areas of the back wall 11e.

The panels 150 and 151 each have two series of diagonal cut lines generally indicated at 158, which cut lines in conjunction with score lines 159 form parallelogram shaped areas or slanting bands 160. It is to be noted that the panels 150 and 151 are offset as at 161 in relation to the front and rear walls of the container.

With the blank folded and glued as described, and in its flat form as in Fig. 24, the container is erected by application of pressure on the opposite side walls as indicated by the arrows. Fig. 25 illustrates the action which occurs as the container is erected. The offset portion 161 of the panels 150 and 151 will be engaged by the side wall 4e, pushing the panels to the left as seen in that figure and causing the parallelogram shaped areas or slanting bands 160 to bend about their lines of articulation 159 as shown.

Complete erection of the carton, as illustrated in Figs. 26 and 27, brings the bands 160 to position at right angles to the side walls of the carton and to the panels 150 and 151 thus forming cells which are particularly easy to load because each cell is full size, that is, bounded by vertical walls only. Also, as seen in Fig. 27, the bands 160 are duplicated near the top and near the bottom of the container to hold the cartridges extremely securely, particularly since the container also provides a center dividing wall. Cartridges 162 are indicated by broken lines in Fig. 27.

It is also to be noted in the container of Figs. 20 through 27 that the panel 152 provides a double wall at the bottom of the container, which wall is of particular importance since the cartridges are packed nose down. It is further to be noted that in this construction no pressure equalizing tabs are necessary. However, on the one side of the partition which is inset, and which is the left side as shown in the drawings, the glue flap of the side wall on that side may be widened or extended somewhat to move the glue seam closer to the center of the container, thus avoiding a possibility that the slight inset of the underlying partition may cause difficulty in applying sufficient pressure to secure adhesion at the seam.

The blank of Fig. 29 is similar to that of Fig. 20 excepting that to the ultimate bottom wall 10f of the container I have shown articulated flaps 163, and articulated to the panel 11f, by line of articulation 164, is a modified partition and divides wall panel generally indicated at 164.

The panel 165 is itself divided into a pair of panels 166 and 167 by a score or fold line 168, which score line is located medially of an offset portion 169 common to both panels.

The panels 166 and 167 are each provided with diagonal cut lines 170 and score lines 171 as shown, thus forming parallelogram shaped areas 172 which areas will ultimately form cells within the container.

Adhesive may be applied as indicated, after which the first folding operation will be to turn inwardly the flaps 163 to a position where they will overlie and be adhered to bottom panel 10f as shown in Fig. 30a. The flaps 163 thus provide a double wall for the bottom of the container. It will be understood that the flaps 163 may be folded while the blank is traveling in its initial direction of motion as indicated by the arrows, and that this can be readily accomplished by timed kickers for the trailing flap, and by breaking the scores of the advancing or forward flap upward and then having this flap meet a slight projection which folds it rearwardly in relation to the direction of travel.

The next folding operation will be to fold the panels 166 and 167 about the line of articulation 164 to the position seen in Fig. 30b where it will be observed that panel 166 will become adhered to panel 11f in the area of adhesive 173.

With the panels thus folded adhesive may now be applied to an area 174 of panel 167, as shown, or to a corresponding area of panel 166. It will be understood that the adhesive 174 may, if desired, be applied previous to the folding of panels 166 and 167 by means of an underneath glue wheel. However, with application of adhesive by either of the methods described, the next step will be to fold reversely about the fold line 168 bringing the panels to the position of Fig. 30c where it will be noted that the panels 166 and 167 will be adhered together within the area of the adhesive application 174.

Thereafter, with the panels retained in their thus folded relation, the next folding operation will be to fold forwardly about the medial score line 10f of the bottom panel bringing the panels to the position seen in Fig. 30d, where it may be observed that panel 167 will now be adhered to front wall panel 2f in the area of adhesive application 175.

The final folding to complete the container will be as shown in Fig. 30e where the side walls have been folded about their medial fold lines 5f and 6f to bring the main glue flaps 7f and 8f to position overlying the rear wall panel 11f. The container thus folded will, of course, be placed under pressure to allow complete adhesion between the various panels.

Fig. 31 shows the container in erected position, the container being brought to that position merely by exerting pressure upon the medial fold lines of the side walls, as in all previous modifications described. In Fig. 31 it is to be noted that by the construction described the cells of the container are formed by a single row of the slanting bands or parallelogram shaped areas 172; that the divider wall, formed by the portions of panels 166 and 167 which adjoin the fold line 168, does not extend completely to the bottom of the container; and that the glue flaps 7f and 8f, being of maximum width form a reinforcement for the rear panel 11f.

An important modification of the carton of Fig. 31 is shown in Fig. 32. The container here illustrated is of proportionately shallow depth as required by certain cartridges and for this purpose the cell formation by a single row of slanting bands 172a is especially applicable and desirable being more simple and easy to produce than the construction of Fig. 27 where the cells are formed by an upper and lower row of the slanting bands.

It is characteristic to note that the slanting bands of Figs. 20 through 32 are placed on each half or rather on each side of the medial line of fold of the inner partition member, in such a way that when the folding is carried out along the medial lines of the partition member the slanting bands are in alignment or registry. In the case of Fig. 27, where the inner partition goes all the way down around the bottom and then up the opposite side wall, there are preferably two such complete series of slanting bands, with an area between them which may be glued together, and in the alternate style like that of Fig. 31 there is just one series on each side of the medial fold line, and a space below that which may be adhered together. The inner partition projects to one side of the medial fold line of the side wall, and this is true of both the type with the single as well as the double row of partitions or compartments.

Referring to Figs. 33 through 37 I have shown a further modification of the partitions and divider. Fig. 33 shows a fragment of a blank similar to that of Fig. 29, the blank being modified in regard to the extreme lower panels 166a and 167a as shown.

The panels 166a and 167a are joined by a fold line or line of articulation 168a and are each provided with a series of horizontally extending cuts or lines of perforation arranged in stepped formation and generally indicated at 170a. Vertical score lines or lines of fold 171a are arranged as shown and these in conjunction with the cut lines 170a form a plurality of rectangular areas or straps 172a which straps will ultimately form the cell walls of the container.

The blank will be folded as by the method described in conjunction with the blank of Fig. 29 resulting in a knock-down container as illustrated in Fig. 34 where the various panels not here described have been provided with reference numerals similar to the blank of Fig. 29. During or before the folding process adhesive will be applied to proper areas so that the inner portions or those portions of the panels 166a and 167a which adjoin the score line 168a will be adhered together. The areas thus adhered are indicated at 180 and 181 in Fig. 34. In the area indicated at 182 the panel 166a may be adhered to the rear wall 11f and in a like area the panel 167a will be adhered to the front wall 2f.

Common to both of the panels 166a and 167a is a central cut out area 182, as shown, and it will be observed that the panels extend beyond the limits of the main body panels of the container at either side.

With the blank folded and glued as in Fig. 34 and with application of pressure upon the side wall members, as required for erecting all other containers described herein, the portions of the panels 166a and 167a which are adhered together by the adhesive areas 180 and 181, and which lie below the horizontal cut lines as seen in that figure, will be moved inward or toward each other thus causing the straps 172a to turn about the score lines 171a as indicated in Fig. 35, which figure is a plan view of the container in partly erected position.

Figs. 36 and 37 illustrate the container in completely erected position with the strap 172a at right angles to the side walls of the carton.

In my preferred arrangement, which is common throughout most forms of the invention as shown and described herein, the glue flap is articulated to the side walls and is preferably placed on the outside of the main body wall to which it is secured, rather than the inside. By this arrangement I accomplish two things:

First, there is no independent folding of the narrow panel by itself, as in each case the folding comprises that of at least half the side panel plus the glue flap, giving a substantial overall width to engage and fold.

Second, the width of the glue flap itself is not limited by the dimensions of the carton, because the width of the glue flap is not determined by the thickness of the cartion itself. Within the limits of the total width of the entire package, the glue flaps can be just as wide as necessary to secure dependable adhesion, and since the area covered is a large factor in obtaining adhesion and also since securing dependable adhesion is an absolute essential particularly for cartons for ammunition and cartridges, the advantages of this arrangement are quite discernable.

Another advantage of the above feature, is that the possible obstruction of an interior glue flap in handicapping the loading or filling of the container is likewise done away with.

It should be noted that, in the several forms of my invention the bottom of the box is in each case a unitary panel, and in no case is there a glue seam at the base or bottom of the box. Particularly in the packaging of ammunition, when the pointed end of the cartridge is usually packed down toward the base of the package, this base is subjected to the greatest strain, and the elimination of a glue seam at the base, is an important feature.

It should be further noted that all of the constructions I have shown are well adapted to be made on the types of high speed automatic gluing and folding machinery, readily available with only minor modifications, which equipment has been touched upon previously in this description. Further, each of the several forms can be glued and folded in multiple units as described, as they are particularly designed with this end in view; the advantage of doubling production, with no additional equipment, is obviously of great importance.

Further, it is shown that my process is well adapted to high speed production of tapering or odd shaped containers if desired, whether they include the integral partition or otherwise, and the several forms can be squared up complete ready for filling and packing merely by pressing in the two medial fold lines and are particularly well adapted thereby to high speed and efficient loading, either by machine or by hand.

In all forms two directions of folding are required, and in each instance there are medial fold lines on both sides as well as on the base or bottom, so that three out of the five sides of the container are defined by lines of fold on medial lines. There are many apparent variations from the description given herein, such as a choice of applying adhesive to a panel or a corresponding portion of the panel which it is to meet; other variations in the particular order of folding or arrangement of flaps, that have already been mentioned and it is apparent that these and other variations of a like nature, come within the spirit and scope of my invention.

Having thus described my invention what I claim as new and desire to secure by Letters Patent is:

1. The method of making knocked-down boxes from cut and creased blanks having a front wall, with side walls having medial lines of fold therein articulated thereto, glue flaps articulated to said side walls, a bottom wall with a medial line of fold therein, a back wall having an inner supporting panel articulated thereto, said inner supporting panel having foldedly connected thereto a partition panel with a medial fold line therein and a glue flap articulated to said partition panel, which includes moving said blanks along in a part parallel to the medial fold line in the bottom wall, folding inwardly along the line of articulation of the back wall and the inner supporting panel and folding reversely along the medial line in the partition panel, retaining all folds in folded position and folding inwardly along the medial line of said bottom wall, changing the direction of motion of the blanks and moving them parallel to the medial fold lines of the side walls, and folding inwardly along said side wall medial fold line.

2. The method of making knocked-down boxes from cut and creased blanks having a front wall, with side walls having medial lines of fold therein articulated thereto, glue flaps articulated to said side walls, a bottom wall with a medial line of fold therein, a back wall having an inner supporting panel articulated thereto, said inner supporting panel having foldedly connected thereto a partition panel with a medial fold line therein and a glue flap articulated to said partition panel, which includes moving said blanks along in a path parallel to the medial fold line in the bottom wall, folding inwardly along the line of articulation of the back wall and the inner supporting panel and folding reversely along the medial line in the partition panel, retaining all folds in folded position and folding inwardly along the medial line of said bottom wall, changing the direction of motion of the blanks and moving them parallel to the medial fold lines of the side walls, and folding inwardly along said side wall medial fold line after applying adhesive between the meeting surfaces of the side wall glue flaps and the back wall.

3. The method of making knocked-down boxes from cut and creased blanks having a front wall, with side walls having medial lines of fold therein articulated thereto, glue flaps articulated to said side walls, a bottom wall with a medial line of fold therein, a back wall having an inner supporting panel articulated thereto, said inner supporting panel having foldedly connected thereto a partition panel with a medial line of fold therein, and a glue flap articulated to said partition panel, which includes moving said blanks along in a path parallel to the medial fold line of the bottom wall, applying adhesive to a portion of the inner supporting panel adjacent to the line of fold of the partition panel and to a portion of the front wall, folding inwardly along the line of articulation of the back wall and the inner supporting panel, and folding reversely along the medial lines of the partition panels, retaining all folds in folded position and folding inwardly along the medial line of said bottom wall, changing the direction of motion of the blanks and moving them parallel to the medial line of fold of the side walls, and folding inwardly along said side wall medial fold lines.

4. The method of making knocked-down boxes from cut and creased blanks having a front wall, with side walls having medial lines of fold therein articulated thereto, glue flaps articulated to said side walls, a bottom wall with a medial line of fold therein, a back wall having an inner supporting panel articulated thereto, said inner supporting panel having foldedly connected thereto a partition panel with a medial line of fold therein and a glue flap articulated to said partition panel, which includes moving said blanks along, applying adhesive to a portion of the inner supporting panel adjacent to the line of fold of the partition panel and to a portion of the front wall, folding inwardly along the line of articulation of the back wall and the inner supporting panel, and folding reversely along the medial line in the partition panel, retaining all folds in folded position and folding inwardly along the medial lines of said bottom wall and thereafter folding inwardly along said side wall medial fold lines.

5. The method of making boxes knocked-down on medial lines of fold which includes making an inward fold and a reverse fold in panels articulated to one main body wall blank, and folding said wall into superposed position over the opposite main body wall said last named fold being carried out on a medial line of fold in a bottom wall connecting said two main body walls.

6. The method of making boxes knocked-down on medial lines of fold which includes making an inward fold and a reverse fold in panels articulated to one main body wall blank, and folding said wall into superposed position over the opposite main body wall said last named fold being carried out on a medial line of fold in a bottom wall connecting said two main body walls and after application of adhesive to retain portions of said first named folded panels to the respective main body walls.

ROBERT MORRIS BERGSTEIN.